United States Patent [19]
Ekowicki

[11] Patent Number: 4,922,373
[45] Date of Patent: * May 1, 1990

[54] OVERTEMPERATURE PROTECTOR FOR INCANDESCENT LAMP

[75] Inventor: Robert L. Ekowicki, Westbrook, Me.

[73] Assignee: GTE Products Corporation, Stamford, Conn.

[ * ] Notice: The portion of the term of this patent subsequent to Jun. 6, 2006 has been disclaimed.

[21] Appl. No.: 318,110

[22] Filed: Mar. 2, 1989

Related U.S. Application Data

[63] Continuation of Ser. No. 131,258, Dec. 7, 1987, Pat. No. 4,837,655, which is a continuation of Ser. No. 514,439, Jul. 18, 1983, abandoned.

[51] Int. Cl.[5] .............................................. H02H 5/04

[52] U.S. Cl. .................................. 361/105; 361/103; 337/100; 337/102; 337/362; 337/377; 315/309; 315/116; 315/117

[58] Field of Search .................. 361/25, 26, 102, 103, 361/105, 32, 34, 37, 104; 307/117; 337/100–102, 85, 333, 362, 377; 315/309, 116, 117

[56] References Cited

U.S. PATENT DOCUMENTS 4,100,397 7/1978 Kunimi ................................ 337/377
4,587,588 5/1986 Goldstein ............................ 361/104

*Primary Examiner*—Todd E. DeBoer
*Attorney, Agent, or Firm*—James Theodosopoulos

[57] ABSTRACT

An overtemperature protector for an incandescent lamp socket housing comprises a glass enclosed circuit breaker and an electrical heater in proximate heat transfer relationship therewith. The heater is in series with the circuit breaker so that when the circuit breaker is open, there can be no current flow through the heater.

7 Claims, 2 Drawing Sheets

OVERTEMPERATURE PROTECTOR FOR INCANDESCENT LAMP

This application is a continuation of application Ser. No. 07/131,258, filed 12/7/87, now U.S. Pat. No. 4,837,655, which is a continuation of Ser. No. 06/514,439 filed 7/18/83, abandoned.

This invention is concerned with recessed fixtures for incandescent lamps and especially with protecting such fixtures from overheating. U.S. Pat. No. 4,131,868 discloses an overtemperature protector which is located in the socket housing for an incandescent lamp. In my invention, the protector is not part of the socket housing and is thereby usable in more different types of installations.

My invention comprises a circuit breaker adapted to be mounted on a fixture containing an incandescent lamp socket housing. Such fixtures are mounted in a ceiling with the socket housing recessed. The circuit breaker can be adapted to be mounted on a part of or on an attachment to such a fixture, for example, a junction box. It may happen that a thick layer of thermal insulation disposed on such a fixture may cause overheating of the socket housing or the fixture or part of the fixture during lamp operation. Such overheating may be undesirable if combustible material is present. It is a purpose of this invention to prevent such overheating.

The circuit breaker is adapted to be connected in series with an incandescent lamp mounted in the socket housing. Thus if the circuit breaker is open, no current can flow to the incandescent lamp. Mounted on or proximate to the circuit breaker is an electrical heater adapted to heat the circuit breaker. The heater is in parallel with the incandescent lamp so that when a switch is turned on to energize the incandescent lamp, there will be current flow through the heater. The arrangement of the circuit breaker and the heater is such that, during operation, the heater will heat the circuit breaker to one temperature when there is no thermal insulation on the fixture, and to a higher temperature when there is such thermal insulation present on the fixture. The circuit breaker is designed to remain closed at said one temperature but to open when the circuit breaker is heated to a higher prdetermined temperature.

Figure 1:
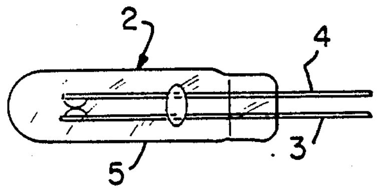
FIG. 1 shows a circuit breaker that can be used in a protector in accordance with this invention.
Figure 2:
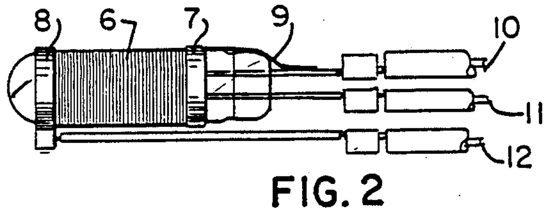
FIG. 2 shows the circuit breaker with heater wire wrapped around it.
Figure 3:
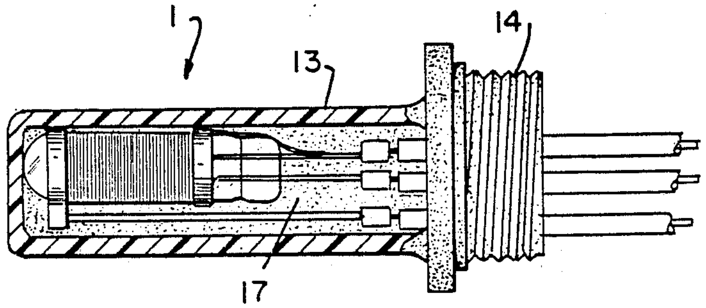
FIG. 3 shows a protector incorporating the circuit breaker ready for mounting on a fixture.
Figure 4:
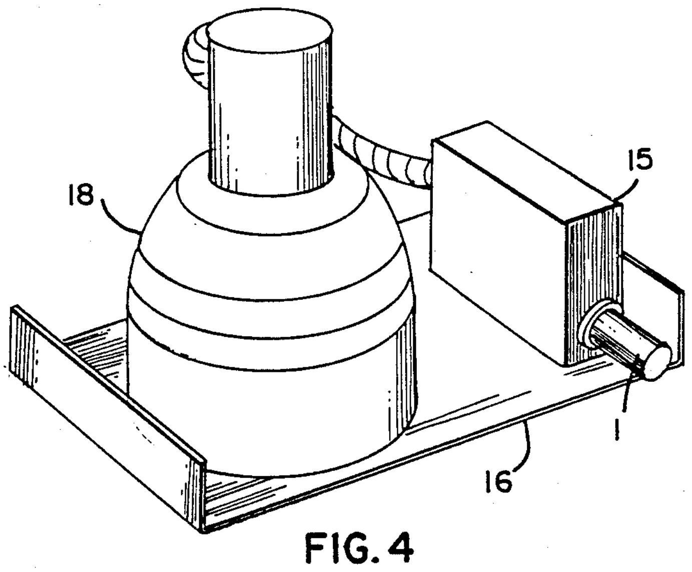
FIG. 4 shows the protector mounted on a fixture.

In one example of a protector in accordance with this invention, protector 1 comprised a type SB glass enclosed circuit breaker 2 having lead-in wires 3 and 4 as shown in FIG. 1. Circuit breaker 2 was normally closed, was designed to open at a temperature of about 150° C. and to reclose upon cooling. Disposed on glass envelope 5 of circuit breaker 2 was a heater 6 comprising about 20 feet of 1.5 mil nickel-chromium insulated heater wire having a resistance of about 355 ohms per foot wrapped around envelope 5. The ends of the heater wire were secured by and connected to spring metal clips 7 and 8 partially encircling envelope 5 and held thereon by tension. If desired, the heater wire and clips could be additionally secured to envelope 5 by a suitable adhesive. One end of heater 6 was electrically connected to lead-in wire 3 by means of metal ribbon 9 connected between lead-in wire 3 and clip 7. There were three lead-in wires 10, 11 and 12 for external electrical protector 1. Lead-in wire 10 was connected to lead-in wire 3. Lead-in wire 11 was connected to lead-in wire 4. Lead-in wire 12 was connected to clip 8, thereby being in electrical connection with the other end of heater 6.

Circuit breaker 2 was mounted within a suitable enclosure 13 made, for example, of high impact plastic. Enclosure 13 was closed at one end and open at the other end, the other end 14 being threaded to permit fastening into a knockout hole of junction box 15 mounted on fixture 16. The interior of enclosure 13 is filled with a suitable potting material 17, for example, epoxy resin, which solidifies after being dispensed into enclosure 13. The purpose of potting material 17 is two fold. First, it secures circuit breaker 2 within enclosure 13. Second, it provides the necessary thermal conductivity for proper operation of the protector. In one example, the epoxy resin used had a thermal conductivity of 5 BTU per hour per degree Fahrenheit per square foot per inch. If desired, the thermal conductivity can be modified by varying the quantity and/or type of filler used in the epoxy resin.

Figure 5:
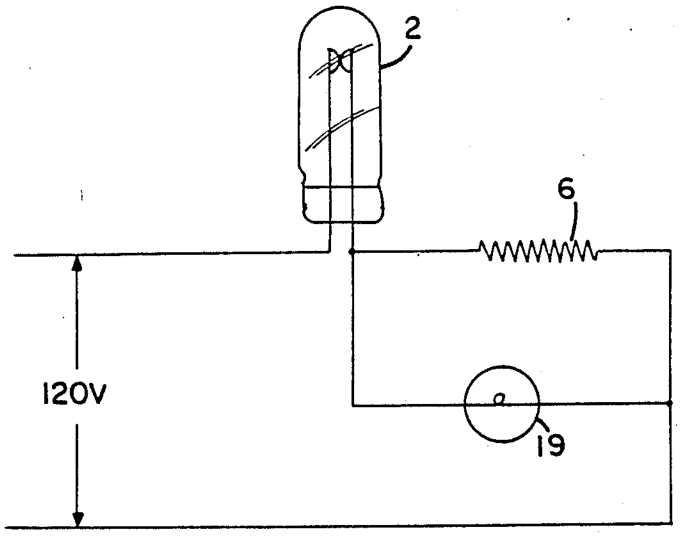
FIG. 5 shows the electrical connection for the protector.

In one example, fixture 16 was 11 inches by 11 inches by 4 inches high and included a housing 18 for a 200 watt incandescent lamp 19. Junction box 15 was located about three inches from housing 18. The above described protector 1 was mounted in a knockout hole of junction box 15. The electrical connections were as shown in FIG. 5. The resistance of heater 6 was about 7000 ohms and, at a line voltage of 120 volts, consumed about 2 watts of electrical power. Without any insulation on fixture 16, circuit breaker 2 attained a temperature of only 110° C. and remained closed. With cellulosic insulation piled on and around fixture 16 to a depth of four inches, circuit breaker 2 was heated to its opening temperature of about 150° C. in about 20 minutes, and opened, thereby shutting off current flow to lamp 19.

I claim:

1. The combination of an overtemperature protector and a housing containing an electric lamp, the overtemperature protector comprising:

a circuit breaker disposed within a glass envelope; an electrical heater in proximate heat transfer relationship with the circuit breaker, said electrical heater consisting of insulated heater wire wrapped around the glass envelope; the heater being in series with the circuit breaker so that when the circuit breaker is open there can be no current flow through the heater; the heater being electrically in parallel with the electric lamp; the overtemperature protector being in heat transfer relationship with the electric lamp housing, so that when the electric lamp housing overheats, the circuit breaker opens and shuts off current flow to the electric lamp.

2. The combination of claim 1 wherein the circuit breaker and the heater are contained within an enclosure, the enclosure having means for mounting to a fixture for said housing.

3. The combination of claim 2 wherein said enclosure is filled with potting material.

4. The combination of claim 2 wherein said means comprises a threaded end of said enclosure for threading into a knockout hole on a junction box.

5. The combination of claim 1 wherein said circuit breaker and heater are contained within an enclosure and secured therein by means of potting material filling the enclosure, the enclosure having means for mounting to a fixture for said housing.

6. The combination of claim 1 wherein during normal operation of the protector without thermal insulation therearound the circuit breaker is closed, but opens when sufficient thermal insulation is present around the protector.

7. The combination of claim 1 and a fixture on which said housing is mounted, the protector being mounted on said fixture, the relationship between the protector and the fixture being such that during normal operation without thermal insulation on the fixture the circuit breaker is closed, but when sufficient thermal insulation is disposed on said fixture, the heater provides sufficient heat to open the circuit breaker.

* * * * *